(12) United States Patent
Cheong et al.

(10) Patent No.: US 9,374,736 B2
(45) Date of Patent: Jun. 21, 2016

(54) APPARATUS AND METHOD OF INDICATING BANDWIDTH IN WIRELESS COMMUNICATION SYSTEM

(71) Applicant: ELECTRONICS AND TELECOMMUNICATIONS RESEARCH INSTITUTE, Daejeon (KR)

(72) Inventors: Min Ho Cheong, Daejeon (KR); Jae Seung Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 150 days.

(21) Appl. No.: 13/890,190

(22) Filed: May 8, 2013

(65) Prior Publication Data

US 2013/0315219 A1    Nov. 28, 2013

(30) Foreign Application Priority Data

May 8, 2012    (KR) .................... 10-2012-0048873
May 8, 2013    (KR) .................... 10-2013-0052192

(51) Int. Cl.
*H04J 3/16*    (2006.01)
*H04W 28/16*    (2009.01)
*H04L 5/00*    (2006.01)
*H04W 28/20*    (2009.01)
*H04L 25/02*    (2006.01)
*H04L 25/03*    (2006.01)
*H04L 27/26*    (2006.01)

(52) U.S. Cl.
CPC ............. *H04W 28/16* (2013.01); *H04L 5/0044* (2013.01); *H04L 5/0094* (2013.01); *H04L 27/2613* (2013.01); *H04L 25/0224* (2013.01); *H04L 25/03891* (2013.01); *H04L 27/2621* (2013.01); *H04W 28/20* (2013.01)

(58) Field of Classification Search
CPC ..... H04W 88/08; H04W 28/16; H04W 84/12; H04W 88/10; H04W 48/04; H04W 72/0406; H04L 27/2607; H04L 5/005; H04L 27/367; H04L 27/265; H04L 27/3872; H04L 27/2628; H04L 72/0413; H04L 5/0053; H04L 1/06; H04L 1/09606; H04L 1/0612; H04L 1/007; H04L 27/2075; H04B 7/0413; H04B 7/0452
USPC ......... 375/260, 267, 295, 343, 346, 348, 143, 375/144, 146, 148, 150, 152, 316; 370/203–210, 329, 468; 455/63.1, 455/114.2, 296
See application file for complete search history.

(56) References Cited

U.S. PATENT DOCUMENTS 8,787,479 B2 *   7/2014   Rouquette-Leveil et al.   375/267
8,873,651 B2 *   10/2014   Muhammad et al. .........   375/260
8,934,572 B2 *   1/2015   Zheng et al. ..................   375/296
9,065,708 B2 *   6/2015   Kim .................... H04L 27/2075

(Continued)

*Primary Examiner* — Hanh N Nguyen

(57) ABSTRACT

The phase rotation relates to an apparatus and method of indicating a bandwidth in a wireless communication system. This disclosure discloses a wireless device comprising a transmission transmitting and receiving a wireless signal and a processor operating in operative connection with the transmission, wherein the processor generates a PPDU (physical protocol data unit) to which a phase rotation application is selectively applied depending on a case of bandwidth indication or a case of no bandwidth indication.

8 Claims, 7 Drawing Sheets

(56) References Cited

U.S. PATENT DOCUMENTS

2013/0229996 A1* 9/2013 Wang et al. .................. 370/329
2014/0126509 A1* 5/2014 You ....................... H04L 5/0053
                                                          370/329

* cited by examiner

APPARATUS AND METHOD OF INDICATING BANDWIDTH IN WIRELESS COMMUNICATION SYSTEM

CROSS-REFERENCE TO RELATED APPLICATIONS

This application claims the benefit of priority of Korean Patent Application No. 10-2012-0048873 filed on May 8, 2012, and Korean Patent Application No. 10-2013-0052192 filed on May 8, 2013, all of which are incorporated by reference in its entirety herein.

BACKGROUND OF THE INVENTION

1. Field of the Invention

The present invention concerns wireless communications, and more specifically, to an apparatus and method of indicating a bandwidth in a wireless communication system.

2. Related Art

A function of dynamically allocating a bandwidth has been newly included in the IEEE 802.11ac standard in order to adaptively respond to frequency selective disturbance of homogeneous and heterogeneous interference signals in a wireless LAN network and to efficiently utilize frequency resources. The dynamic bandwidth allocation is a function of the VHT STA and may be defined as the exchange of RTS/CTS negotiating a channel width potentially reduced compared with a channel width indicated by the RTS. However, in the dynamic bandwidth allocation, the PAPR (peak to average power ratio) of the SIG may occur and there is a need for addressing such problem.

SUMMARY OF THE INVENTION

An object of the present invention is to provide an apparatus and method of indicating a bandwidth in a wireless communication system.

According to an aspect of the present invention, a wireless device is provided comprising a transmission transmitting and receiving a wireless signal and a processor operating in operative connection with the transmission, wherein the processor generates a PPDU (physical protocol data unit) to which a phase rotation application is selectively applied depending on a case of bandwidth indication or a case of no bandwidth indication.

In the case of bandwidth indication, the processor may generate the PPDU to which the phase rotation application is not applied based on a TXVECTOR parameter denoting bandwidth exchange (BW_EXCHANGE).

The processor may generate an SIG field including one bit of DYN_BANDWIDTH denoting that the bandwidth indication is dynamic or static.

According to another aspect of the phase rotation, a method of performing a bandwidth indication by a wireless device in a wireless LAN system is provided. The method comprises generating a PPDU (physical protocol data unit) to which a phase rotation application is selectively applied depending on a case of bandwidth indication or a case of no bandwidth indication and transmitting the PPDU.

In the case of bandwidth indication, the PPDU to which the phase rotation application is not applied may be generated based on a TXVECTOR parameter denoting bandwidth exchange (BW_EXCHANGE).

The method may further comprise generating an SIG field including one bit of DYN_BANDWIDTH denoting that the bandwidth indication is dynamic or static.

Advantageous Effects

In the dynamic bandwidth allocation (or dynamic frequency allocation), phase rotation is selectively allowed while the bandwidth information pre-defined in the existing preamble is utilized, thus addressing problems that may occur when phase rotation is applied inflexibly as conventional.

DESCRIPTION OF EXEMPLARY EMBODIMENTS

Hereinafter, some embodiments of the disclosure will be described in detail with reference to the accompanying drawings. The same reference numbers are used to denote the same elements throughout the specification and the drawings. When determined to make the gist of the present invention unclear, the detailed description of the related elements or functions will be skipped.

The description of this disclosure targets a communication network. The task performed in the communication network may be done while a system (e.g., base station) in charge of the corresponding communication network controls the network and data is transmitted or received or may be done in a terminal linked with the corresponding network.

Figure 1:
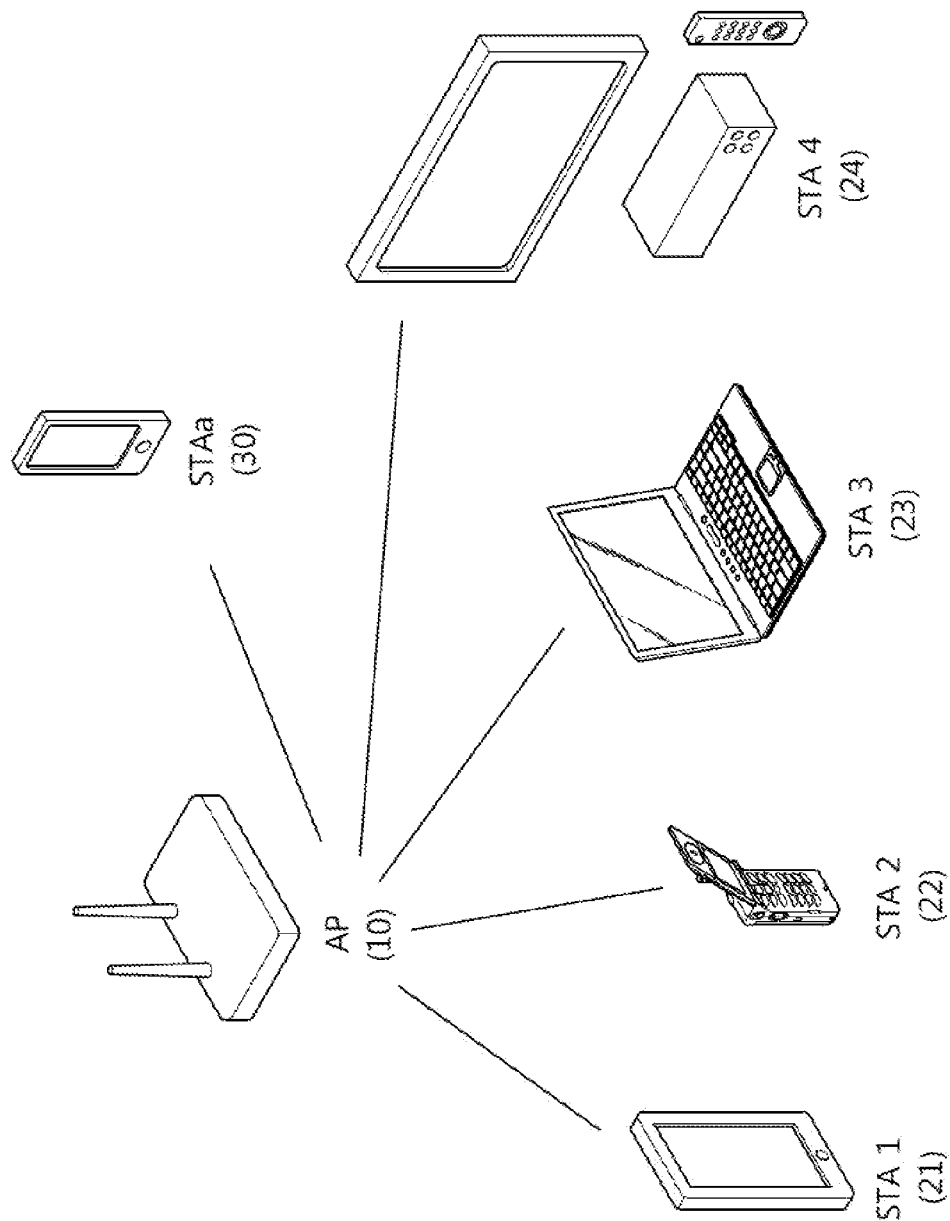
FIG. 1 is a view illustrating a configuration of a conventional wireless LAN (Local Area Network: WLAN) system to which an embodiment of the present invention may apply.

FIG. 1 is a view illustrating a configuration of a conventional wireless LAN (Local Area Network: WLAN) system to which an embodiment of the present invention may apply.

Referring to FIG. 1, the WLAN system includes one or more basic service sets (BSSs). The BSS is a set of stations (STAs) that may be successfully synchronized with each other and may communicate with each other and is not a concept that indicates a specific area.

The infrastructure BSS includes one or more non-AP stations (non-AP STA1(21), non-AP STA2(22), non-AP STA3(23), non-AP STA4(24), non-AP STAa(30)), an AP (Access Point, 10) that provides a distribution service, and a DS (Distribution System) that distributes multiple APs. In the infrastructure BSS, the AP manages the non-AP STAs of the BSS.

In contrast, the independent BSS (IBSS) is a BSS operating in an ad-hoc mode. Since the IBSS does not include an AP, there is no centralized management entity that performs a central management function. That is, in the IBSS, the non-AP STAs are managed in a distributed manner. In the IBSS, all the STAs may be configured as mobile STAs and none of the STAs are allowed to access the DS, so that the STAs form a self-contained network.

The STA is a functional medium that includes a medium access control (MAC) following the IEEE (Institute of Electrical and Electronics Engineers) 802.11 standards and a physical layer interface for a wireless medium and in a wide sense includes both an AP and a non-AP station.

The non-AP STA is not an AP but an STA. The non-AP STA may also be referred to as a mobile terminal, wireless device, wireless transmit/receive unit (WTRU), user equipment (UE), mobile station (MS), mobile subscriber unit or simply as a user. Hereinafter, for ease of description, the non-AP STA is referred to as STA.

The AP is a functional entity that provides access to the DS via a wireless medium for an STA associated with the AP. In the infrastructure BSS including the AP, communication between STAs is basically conducted via the AP, but in case a direct link is set up, the STAs may perform direct communication therebetween. The AP may also be referred to as a central controller, base station (BS), node-B, BTS (Base Transceiver System), site controller, or management STA.

A plurality of infrastructure BSSs including the BSS shown in FIG. 1 may be connected to each other through a distribution system (DS). The plurality of BSSs connected to each other through the DS is called an extended service set (ESS). The AP and/or STAs included in the ESS may communicate with each other, and in the same ESS, an STA may shift from a BSS to another BSS while performing seamless communication.

In a wireless LAN system following the IEEE 802.11 standard, the basic access mechanism of the MAC (Medium Access Control) is a CSMA/CA (Carrier Sense Multiple Access with Collision Avoidance) mechanism. The CSMA/CA mechanism is also referred to as a distributed coordination function (DCF) of the IEEE 802.11 MAC, and this basically adopts a "listen before talk" access mechanism. According to such type of access mechanism, the AP and/or STA, before starting transmission, senses a wireless channel or medium. If a result of the sensing shows that the medium is in an idle status, frames start to be transmitted through the corresponding medium. In contrast, if the medium is sensed to be in an occupied status, the corresponding AP and/or STA, without starting its own transmission, establishes a delay period for medium access and stands by.

The CSMA/CA mechanism includes virtual carrier sensing in addition to the physical carrier sensing in which the AP and/or STA directly senses the medium. The virtual carrier sensing is provided for addressing problems that may occur in relation to the medium access, such as a hidden node problem. The MAC of the wireless LAN system uses a network allocation vector (NAV). The NAV is a value by which an AP and/or STA currently using the medium or having a right to use the medium lets another AP and/or STA know the time left until the medium gets back to an available status. Accordingly, the value set as the NAV corresponds to a time period scheduled to use the medium by the AP and/or STA that transmits a corresponding frame.

The IEEE 802.11 MAC, together with the DCF, offers an HCF (Hybrid Coordination Function) that is based on the PCF (Point Coordination Function) that performs periodic polling so that all the receiving APs and/or STAs may receive data packets with the DCF in a polling-based synchronous access scheme. The HCF has EDCA (Enhanced Distributed Channel Access) that adopts a contention-based scheme for a provider to supply data packets to multiple users and HCCA (HCF Controlled Channel Access) that adopts a contention-free based channel access scheme using a polling mechanism. The HCF includes a medium access mechanism for enhancing the QoS (Quality of Service) of the wireless LAN and may transmit data during both a contention period CP and a contention-free period (CFP).

The wireless communication system, due to the characteristics of the wireless medium, cannot be aware of the existence of a network when the STA powers on and starts its operation. Accordingly, an STA—no matter what type it is—should undergo a network discovery process in order to access the network. When discovering a network through the network discovery process, the STA selects a network to which the STA is to subscribe through a network selecting process. Thereafter, the STA subscribes to the selected network and performs a data exchanging operation that is done at the transmission end/reception end.

In the wireless LAN system, the network discovery process is implemented as a scanning procedure. The scanning procedure is divided into passive scanning and active scanning. The passive scanning is achieved based on a beacon frame that is periodically broadcast by the AP. In general, the AP of the wireless LAN broadcasts the beacon frame at a certain interval (e.g., every 100 msec). The beacon frame includes information on a BSS managed by the AP. The STA stands by to passively receive the beacon frame through a particular channel. When obtaining the information on the network by receiving the beacon frame, the STA ends the scanning procedure through the particular channel. Since the passive scanning is achieved only when the STA receives the beacon frame without the need of transmitting a separate frame, the overall overhead may be reduced. However, the scanning time may be increased in proportion to the transmission period of the beacon frame.

In the active scanning, the STA actively broadcasts a probe request frame on a particular channel to request network information from all the APs receiving the probe request frame. When receiving the probe request frame, the AP stands by during a random time so as to prevent frame collision and then sends a probe response frame including the network information to the corresponding STA. The STA receives the probe response frame and obtains the network information, thereby ending the scanning procedure. The active scanning may terminate the scanning within relatively a short time. On the contrary, in accordance with request-response, a frame sequence is needed, thus resulting in an increase in the overall network overhead.

When terminating the scanning procedure, the STA selects a network in accordance with a specific reference for the STA and performs an authentication procedure with the AP. The authentication procedure is done in a 2-way handshake manner. When finishing the authentication procedure, the STA proceeds with an association procedure with the AP.

The association procedure is conducted in a 2-way handshake manner. First, the STA transmits an association request frame to the AP. The association request frame includes information on the capabilities of the STA. Based on this, the AP determines whether to permit association with the corresponding STA. When determining whether to permit association, the AP sends an association response frame to the corresponding STA. The association response frame includes information indicating whether to permit association and information on the reasons for success/failure of the association. The association response frame further includes information on the capabilities that may be supported by the AP. In case the association is successfully done, frame exchange is normally conducted between the AP and the STA. In case the association fails, the association procedure is re-attempted based on the information on the failure that is included in the association response frame or the STA may send a request for association to other APs.

As a technical standard that has been relatively recently established to address the limited communication speed that has been pointed out as a weakness in the wireless LAN, there is IEEE 802.11n. IEEE 802.11n aims to increase network speed and reliability and to expand the operation distance of a wireless network. More specifically, IEEE 802.11n supports a high throughput (HT) with a data processing speed up to 540 Mbps or more and is based on MIMO (Multiple Inputs and Multiple Outputs) technology in which multi-antennas are used at both the transmission unit and reception unit so as to minimize transmission errors while optimizing data rate.

As the wireless LAN spreads and a diversity of applications using the same are introduced, a need exists for a new wireless LAN system that may support a higher throughput than that supported by IEEE 802.11n. The wireless LAN system, which supports very high throughput (VHT), is a next version of the IEEE 802.11n wireless LAN system and is among the IEEE 802.11 wireless LAN systems that have been recently suggested to support a throughput of 500 Mbps or more for a single user and a throughput of 1 Gbps or more for multiple users in an MAC service access point (SAP).

While the existing wireless LAN system supports 20 MHz or 40 Mhz, the VHT wireless LAN system is to support 80 Mhz, contiguous 160 MHz, non-contiguous 160 MHz bandwidth transmission and/or higher bandwidth transmission. In addition to this, the VHT wireless LAN system supports 256QAM whereas the existing wireless LAN system supports a maximum of 64 QAM (Quadrature Amplitude Modulation).

For a higher throughput, the VHT wireless LAN system supports a MU-MIMO (Multi User-Multiple Input Multiple Output) transmission scheme, and thus, an AP may simultaneously transmit data frames to at least one or more STAs that are MIMO-paired. The maximum number of the paired STAs may be 4, and when the maximum number of spatial streams is 8, a maximum of 4 spatial streams may be allocated to each STA.

Referring back to FIG. 1, in the wireless LAN system as shown, the AP 10 may simultaneously transmit data to an STA group including at least one or more of a plurality of STAs 21, 22, 23, 24, and 30 that are associated with the AP 10. Although in FIG. 1 the AP performs MU-MIMO transmission to the STAs, in a wireless LAN system that supports TDLS (Tunneled Direct Link Setup) or DLS (Direct Link Setup), or mesh network, an STA that intends to transmit data may send a PPDU to a plurality of STAs using an MU-MIMO transmission scheme. Hereinafter, an example where the AP transmits the PPDU to the plurality of STAs according to the MU-MIMO transmission scheme is described.

Data which is transmitted to each STA may be transmitted through different spatial streams. The data packet transmitted from the AP 10 may be referred to as a frame, such as a PPDU generated in the physical layer of the wireless LAN system and transmitted therefrom or a data field included in the PPDU. That is, the PPDU for SU (single user)-MIMO and/or MU-MIMO or the data field included in the PPDU may be referred to as the MIMO packet. Among them, the PPDU for MU may be referred to as a MU packet. In the embodiment of the present invention, it is assumed that the transmission target STA group MU-MIMO paired with the AP 10 includes the STA1 21, STA2 22, STA3 23, and STA4 24. At this time, no spatial stream is allocated to a particular STA of the transmission target STA group, so that no data may be transmitted. Meanwhile, it is assumed that the STAa 30 is an STA that is associated with the AP but is not included in the transmission target STA group.

In the wireless LAN system, an identifier may be allocated to the transmission target STA group for supporting MU-MIMO transmission, and this is referred to as a group ID. The AP transmits a group ID management frame including group definition information to the STAs supporting MU-MIMO transmission for allocating a group ID, and accordingly, the group ID is allocated to the STAs before a PPDU is transmitted. One STA may be assigned a plurality of group IDs.

Table 1 below represents information elements included in the group ID management frame:

TABLE 1

| order | information |
|---|---|
| 1 | category |
| 2 | VHT action |
| 3 | membership status |
| 4 | user position array |

The category field and VHT action field are set to identify that the corresponding frame is a management frame and is a group ID management frame used in the MU-MIMO-supportive VHT wireless LAN system.

As shown in Table 1, the group definition information includes membership status information indicating whether it belongs to a specific group ID and spatial stream position information indicating, when it belongs to a corresponding group ID, the spatial stream set of the corresponding STA corresponds to what number of position in the overall spatial stream according to the MU-MIMO transmission.

Since one AP manages a plurality of group IDs, the membership status information provided to one STA needs to indicate whether the STA belongs to each group ID managed by the AP. Accordingly, the membership status information may be provided in the form of an array of sub fields indicating whether it belongs to each group ID. The spatial stream position information indicates a position for each group ID, and thus, may be present in the form of an array of sub fields indicating the position of a spatial stream set occupied by the STA with respect to each group ID. Further, the membership status information and spatial stream position information for one group ID may be implemented in one sub field.

When the AP transmits a PPDU to a plurality of STAs through an MU-MIMO transmission scheme, the AP includes information indicating a group ID in the PPDU as control information. When receiving the PPDU, the STA identifies the group ID to verify whether the STA is a member STA of the transmission target STA group. If the STA is verified as a member of the transmission target STA group, it may be identified at what number of position of the overall spatial stream the spatial stream set transmitted to the STA is located. The PPDU includes the information on the number of spatial streams allocated to the receiving STA, and thus, the STA may receive data by discovering the spatial stream allocated thereto.

Meanwhile, as a frequency band newly available in the wireless LAN system, the TV WS (White Space) draws attention. The TV WS refers to an unused frequency band that remains as the analog TV turns into the digital TV in the U.S. The TV WS may include, e.g., a band of 54 to 698 MHz. However, this is merely an example, and the TV WS may be a licensed band of which a licensed user has priority in use. The licensed user means a user licensed to use the permitted band, and may also be referred to as a licensed device, primary user, or incumbent user.

The AP and/or STA operating on the TV WS should provide a function of protecting the licensed user because the licensed user has priority in use of the TV WS band. For example, in case a licensed user, e.g., a microphone, already uses a specific WS channel that is a frequency band split to have a particular bandwidth in the TV WS band in accordance with the protocol, the AP and/or STA may not use the frequency band corresponding to the corresponding WS channel so as to protect the licensed user. Further, the AP and/or STA should terminate use of the corresponding frequency band when the licensed user happens to use the licensed band that is currently used for frame transmission and/or reception.

Accordingly, the AP and/or STA should first perform a procedure of grasping whether a specific frequency band is available in the TV WS band, in other words, whether there is a licensed user in the frequency band. To grasp whether there is a licensed user in the specific frequency band is referred to as spectrum sensing. As spectrum sensing mechanisms, an energy detection scheme or a signature detection scheme is utilized. As the strength of a received signal reaches a predetermined value or more, it is determined that a licensed user is in use, or if a DTV preamble is detected, it may be determined that the licensed user is in user.

Figure 2:
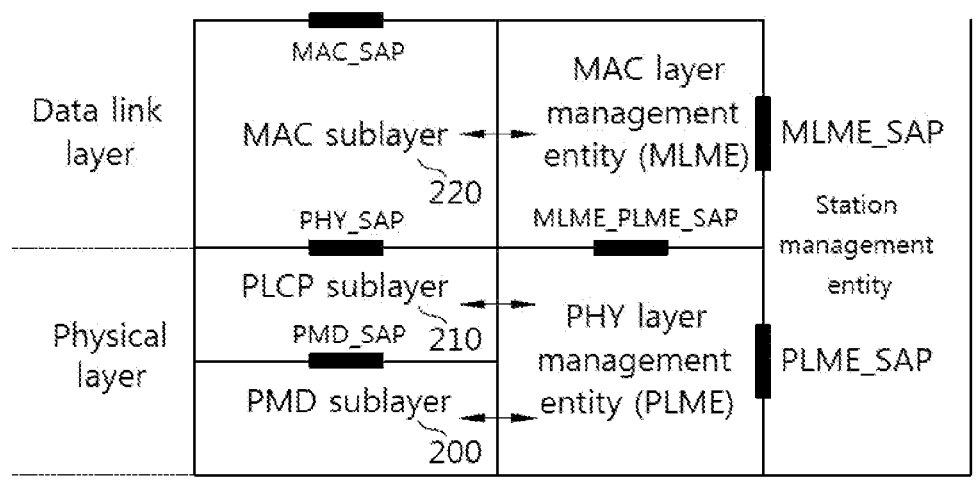
FIG. 2 is a view illustrating a physical layer architecture of a wireless LAN system supported by IEEE 802.11.

FIG. 2 is a view illustrating a physical layer architecture of a wireless LAN system supported by IEEE 802.11.

The IEEE 802.11 PHY architecture consists of a PLME (PHY Layer Management Entity), a PLCP (Physical Layer Convergence Procedure) sublayer 210, and a PMD (Physical Medium Dependent) sublayer 200. The PLME cooperates with an MLME (MAC Layer Management Entity) to provide a function of managing the physical layer. The PLCP sublayer 210 transfers an MPDU (MAC Protocol Data Unit) that is received from the MAC sublayer 220 to the PMD sublayer according to an instruction of the MAC layer between the MAC sublayer 220 and the PMD sublayer 200 or transfers a frame coming from the PMD sublayer 200 to the MAC sublayer 220. The PMD sublayer 200 is a PLCP lower layer and enables transmission and reception of a physical layer entity between two stations through a wireless medium. The MPDU transferred from the MAC sublayer 220 is called a PSDU (Physical Service Data Unit) in the PLCP sublayer 210. The MPDU is similar to the PSDU. However, in case an A-MPDU (aggregated MPDU) that is obtained by aggregating a plurality of MPDUs is transferred, each MPDU may be different from the PSDU.

The PLCP sublayer 210 adds necessary information by a physical layer transceiver in a process of receiving a PSDU from the MAC sublayer 220 and transmitting it to the PMD sublayer 200. At this time, the added fields may include, in the PSDU, a PLCP preamble, a PLCP header, and tail bits necessary to return the convolution encoder to a zero state. The PLCP sublayer 210 receives, from the MAC sublayer, a TXVECTOR parameter including control information necessary to generate and transmit the PPDU and control information necessary for the receiving STA to receive and analyze the PPDU. The PLCP sublayer 210 uses the information included in the TXVECTOR parameter when generating the PPDU including the PSDU.

The PLCP preamble serves to allow the receiver to prepare for a synchronization function and antenna diversity function before the PSDU is transmitted. The data field may include, in the PSDU, padding bits, a service field including a bit sequence for initializing the scrambler and a coded sequence in which a bit sequence added with tail bits is encoded. At this time, as an encoding scheme in accordance with encoding schemes supported by the STA receiving the PPDU, one of BCC (Binary Convolution Coding) encoding or LDPC (Low Density Parity Check) encoding may be chosen. The PLCP header may include a field that contains information on the PPDU (PLCP Protocol Data Unit) to be transmitted.

The PLCP sublayer 210 adds the above-described fields to the PSDU to generate the PPDU (PLCP Protocol Data Unit) and transmits it to a receiving station via the PMD sublayer, and the receiving station receives the PPDU to obtain information necessary for recovering data from the PLCP preamble and the PLCP header. The PLCP sublayer of the receiving station transfers the RXVECTOR parameter including control information contained in the PLCP preamble and the PLCP header to the MAC sublayer such that it can analyze the PPDU in a receiving status and can obtain data.

Figure 3:
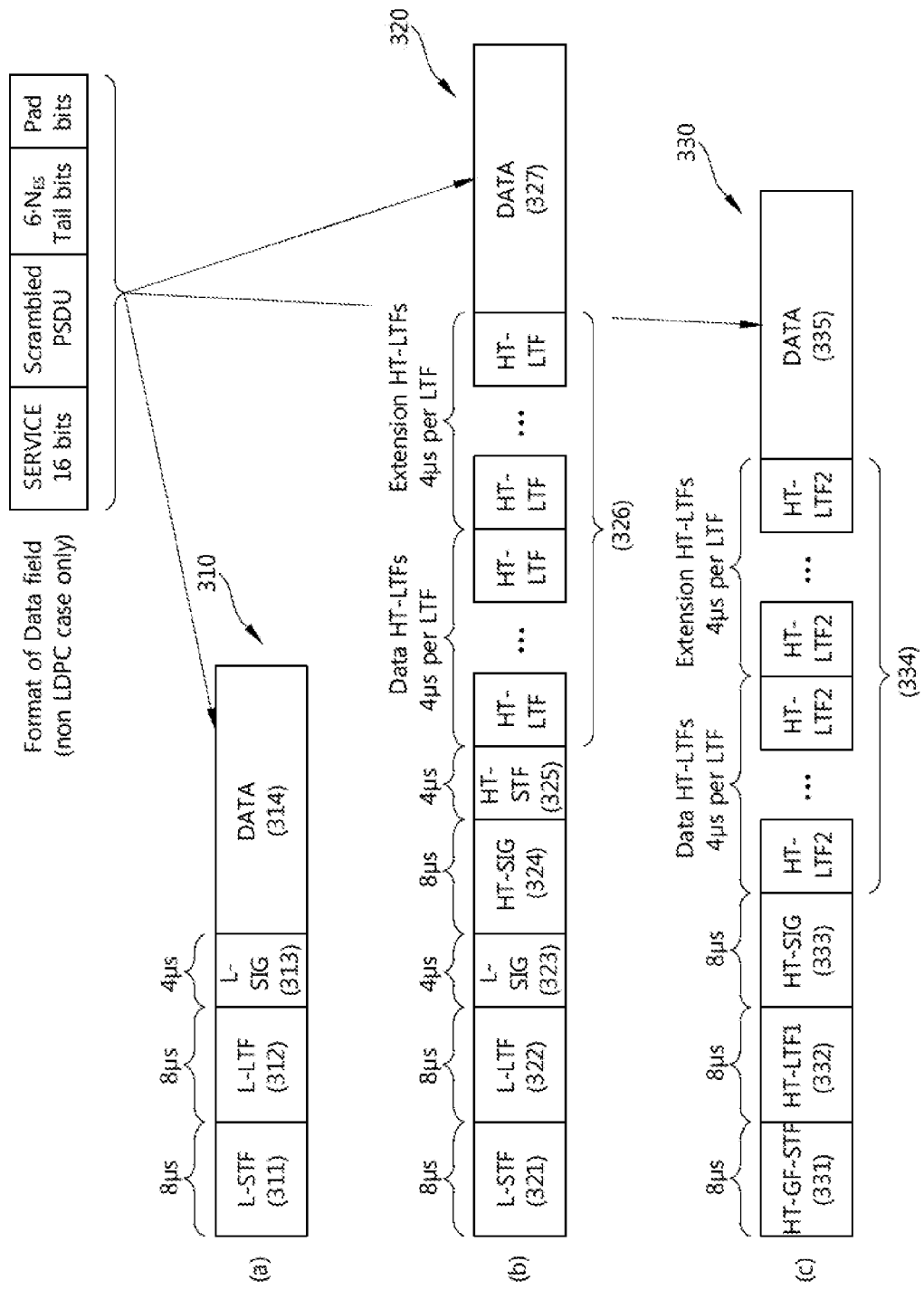
FIGS. 3 and 4 are block diagrams illustrating the format of PPDUs used in a wireless LAN system to which an embodiment of the present invention may apply.
Figure 4:
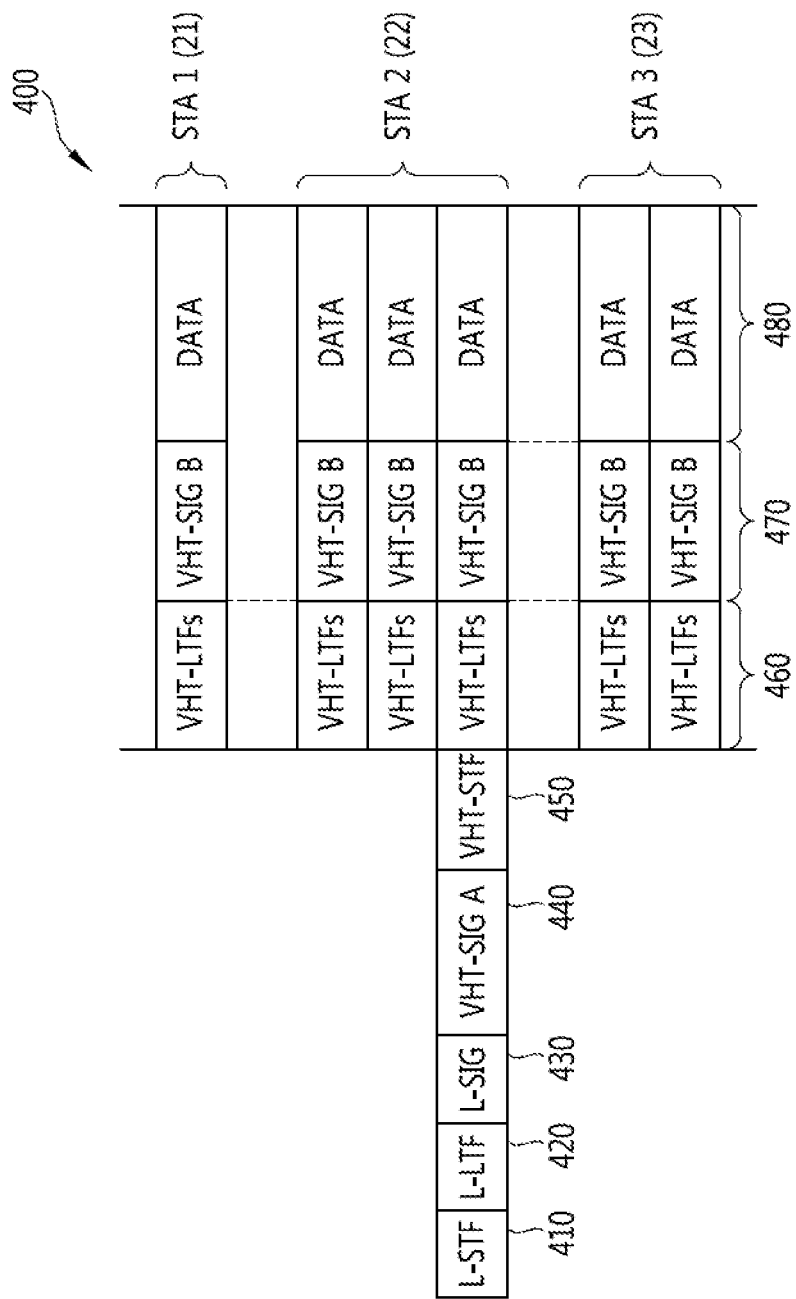

FIGS. 3 and 4 are block diagrams illustrating the format of PPDUs used in a wireless LAN system to which an embodiment of the present invention may apply. Hereinafter, the STA operating in a legacy wireless LAN system based on IEEE 802.11a/b/g, existing wireless LAN standards before IEEE 802.11n, is referred to as a legacy STA (L-STA). Further, the STA that may support the HT in an HT wireless LAN system that is based on IEEE 802.11n is referred to as an HT-STA.

FIG. 3(a) shows the format of a legacy PPDU (L-PPDU) that is a PPDU used in the existing wireless LAN system standards, IEEE 802.11a/b/g, before IEEE 802.11n. Accordingly, the legacy STA (L-STA) in the HT wireless LAN system to which the IEEE 802.11n standard applies may transmit and receive an L-PPDU having such format.

Referring to FIG. 3(a), the L-PPDU 310 includes an L-STF 311, an L-LTF 312, an L-SIG field 313, and a data field 314.

The L-STF 311 is used for frame timing acquisition, AGC (Automatic Gain Control) convergence, and coarse frequency acquisition.

The L-LTF 312 is used for frequency offset and channel estimation.

The L-SIG field 313 includes control information for demodulating and decoding the data field 314.

The L-PPDU may be transmitted in the order of the L-STF 311, the L-LTF 312, the L-SIG field 313, and the data field 314.

FIG. 3(b) is a block diagram illustrating the format of an HT-mixed PPDU that enables an L-STA and an HT-STA to co-exist. Referring to FIG. 3(b), the HT-mixed PPDU 320 includes an L-STF 321, an L-LTF 322, an L-SIG 323, an HT-SIG 324, an HT-STF 325, and a plurality of HT-LTFs 326 and data fields 327.

The L-STF 321, the L-LTF 322, and the L-SIG field 323 are the same as the elements 311, 312, and 313, respectively, as shown in FIG. 3(a). Thus, the L-STA, although receiving the HT-mixed PPDU 320, may interpret the data field through the L-LTF 322, the L-LTF 322, and the L-SIG field 323. However, the L-LTF 322 may further include information for channel estimation that is to be performed for the HT-STA to receive the HT-mixed PPDU 320 and decipher the L-SIG field 323, the HT-SIG 324, and the HT-STF 325.

The HT-STA may be aware that the HT-mixed PPDU 320 is a PPDU for the HT-STA through the HT-SIG 324 that comes behind the L-SIG field 323, and based on this, may demodulate and decode the data fields 327.

The HT-STF 325 may be used for frame timing synchronization and AGC convergence for the HT-STA.

The HT-LTF 326 may be used for channel estimation for demodulating the data field 327. Since IEEE 802.11n supports SU-MIMO, a plurality of HT-LTFs 326 may be provided for conducting channel estimation on each of the data fields transmitted from a plurality of spatial streams.

The HT-LTFs 326 may include a data HT-LTF used for channel estimation on the spatial stream and an extension HT-LTF additionally used for full channel sounding. Accordingly, the number of the plurality of HT-LTFs 326 may be equal to or larger than the number of spatial streams transmitted.

The L-STF 321, the L-LTF 322, and the L-SIG field 323 of the HT-mixed PPDU 320 are first transmitted so that the L-STA may receive it to obtain data. Thereafter, the HT-SIG 324 is transmitted for demodulation and decoding of data transmitted for the HT-STA.

The HT-SIG 324 and the fields positioned before the HT-SIG 324 are transmitted with no beamforming being performed, so that the L-STA and the HT-STA may receive the corresponding PPDU to obtain data, and the HT-STF 325, the HT-LTFs 326 and the data fields 327 transmitted thereafter are subjected to wireless signal transmission through precoding. Here, the HT-STF 325 is transmitted and the plurality of HT-LTFs 326 and data fields 327 are then transmitted in order for an STA performing precoding and reception to take into account the part whose electric power is varied due to the precoding.

Although in the HT wireless LAN system the HT-STA adopting 20 MHz uses 52 data subcarriers per OFDM symbol, the L-STA adopting the same frequency, 20 MHz, still uses 48 data subcarriers per OFDM symbol. For supporting backward compatibility with the existing system, in the HT-mixed PPDU 320 format, the HT-SIG field 324 is decoded using the L-LTF 322, so that the HT-SIG field 324 consists of 48×2 data subcarriers. Thereafter, the HT-STF 325 and the HT-LTF 426 consists of 52 data subcarriers per OFDM symbol. As a result, the HT-SIG field 324 consists of 24 bits because it is supported with ½, BPSK (Binary Phase Shift Keying), it is transmitted as a total of 48 bits. That is, the channel estimation for the L-SIG field 323 and the HT-SIG field 324 makes use of the L-LTF 322, and the bit sequence constituting the L-LTF 322 is represented as shown in Table 1. The L-LTF 322 consists of 48 data subcarriers per symbol, excluding a DC subcarrier.

$$L_{-26,26} = \{1,1,-1,-1,1,1,-1,1,-1,1,1,1,1,1,1,-1,-1,1,\\ 1,-1,1,-1,1,1,1,1,0,1,-1,-1,1,1,-1,1,-1,1,-1,-\\ 1,-1,-1,-1,1,1,-1,-1,1,1,-1,1,1,1,1\} \quad [\text{Equation 1}]$$

FIG. 3(c) is a block diagram illustrating the format of an HT-Greenfield PPDU 330 that may be used only by an HT-STA. Referring to FIG. 3(c), the HT-GF PPDU 330 includes an HT-GF-STF 331, an HT-LTF1 332, an HT-SIG 333, a plurality of HT-LTF2s 334 and data fields 335.

The HT-GF-STF 331 is used for frame timing acquisition and AGC.

The HT-LTF1 332 is used for channel estimation.

The HT-SIG 333 is used for demodulating and decoding the data fields 335.

The HT-LTF2 334 is used for channel estimation for demodulating the data field 335. Likewise, since the HT-STA uses SU-MIMO and thus requires channel estimation on each of the data fields transmitted through a plurality of spatial streams, a plurality of HT-LTFs 326 may be provided.

The plurality of HT-LTF2s 334, like the HT-LTFs 326 of the HT-mixed PPDU 320, may include a plurality of data HT-LTFs and a plurality of extension HT-LTFs.

Each of the data fields 314, 327, and 335 shown in FIGS. 3(a), 3(b), and 3(c) may include a service field, a scrambled PSDU, a tail bit and a padding bit. The service field may be used for initializing the scrambler. The service field may be set to have 16 bits. In such case, 7 bits may be assigned for initializing the scrambler. The tail bit may include a bit sequence necessary for turning the convolution encoder back into a zero status. The tail bit may be assigned with a bit size that is proportional to the number of BCC (Binary Convolutional Code) encoders used for encoding data to be transmitted, and more specifically, the tail bit may be implemented to have six bits per the number of BCCs.

FIG. 4 is a view illustrating an exemplary PPDU format used in a wireless LAN system that supports VHT.

Referring to FIG. 4, the PPDU 400 may include an L-STF 410, an L-LTF 420, an L-SIG field 430, a VHT-SIGA field 440, a VHT-STF 450, a VHT-LTF 460, a VHT-SIGB field 470, and a data field 480.

The PLCP sublayer constituting the PHY adds necessary information to the PSDU received from the MAC layer and converts it to the data field 480, and adds, to the converted result, fields such as the L-STF 410, the L-LTF 420, the L-SIG field 430, the VHT-SIGA field 440, the VHT-STF 450, the VHT-LTF 460, and the VHT-SIGB field 470, thereby generating the PPDU 400. The PLCP sublayer then transmits the generated PPDU 400 to one or more STAs through the PMD sublayer constituting the PHY. The control information necessary for the PLCP sublayer to generate the PPDU and the control information that is included in the PPDU and transmitted and that is used for a receiving STA to interpret the PPDU are provided from the TXVECTOR parameter that is received from the MAC layer.

The L-STF 410 is used for frame timing acquisition, AGC (Automatic Gain Control) convergence, or coarse frequency acquisition.

The L-LTF 420 is used for channel estimation for demodulating the L-SIG field 430 and the VHT-SIGA field 440.

The L-SIG field 430 is used for the L-STA to receive and interpret the PPDU 400 to obtain data. The L-SIG field 430 includes a rate sub length, a length sub field, a parity field, and a tail field. The rate sub field is set as a value that is indicative of a bit rate for data to be currently transmitted.

The length sub field is set as a value that is indicative of the octet length of the PSDU that the MAC layer requests the PHY layer to transmit. At this time, a parameter associated with information on the octet length of the PSDU, i.e., L_LENGTH parameter, is determined based on a parameter associated with a transmission time, TXTIME parameter. TXTIME refers to a transmission time determined for the PHY layer to transmit the PPDU including the PSDU corresponding to the transmission time that the MAC layer requests for transmission of the PSDU (physical service data unit). Accordingly, the L_LENGTH parameter is a time-related parameter, and thus, the length sub field included in the L-SIG field 430 happens to contain information associated with the transmission time.

The VHT-SIGA field 440 includes control information (or signal information) necessary for STAs receiving the PPDU to interpret the PPDU 400. The VHT-SIGA field 440 is transmitted as two OFDM symbols. Accordingly, the VHT-SIGA field 440 may be divided into a VHT-SIGA1 field and a VHT-SIGA2 field. The VHT-SIGA1 field includes channel bandwidth information used for transmission of the PPDU, identification information as to whether STBC (Space Time Block Coding) is used, information indicating which one of SU-MIMO and MU-MIMO is used to transmit the PPDU, information indicating a transmission target STA group including a plurality of MU-MIMO paired in case the transmission scheme is MU-MIMO, and information on a spatial stream allocated to each of the STAs included in the transmission target STA group. The VHT-SIGA2 field includes short guard interval (SGI)-related information.

The information indicative of an MIMO transmission scheme and the information indicative of a transmission target STA group may be implemented as a piece of MIMO indication information, and by way of example, may be implemented as a group ID. The group ID may be set as a value having a certain range. In case a specific value in the range indicates an SU-MIMO transmission scheme while the others in the range indicate that the PPDU 400 is transmitted in an MU-MIMO transmission scheme, the group ID may be utilized as an identifier for the corresponding transmission target STA group.

If the group ID indicates that the PPDU 400 is transmitted in an SU-MIMO transmission scheme, the VHT-SIGA2 field includes coding indication information indicative of whether the coding scheme that applies to the data field is BCC (Binary Convolution Coding) or LDPC (Low Density Parity Check) coding and MCS (modulation coding scheme) information on a transmitter-receiver channel. Further, the VHT-SIGA2 field may include an AID of a transmission target STA of the PPDU and/or a partial AID including a partial bit sequence of the AID.

If the group ID is indicative that the PPDU 400 is transmitted through the MU-MIMO transmission scheme, the VHT-SIGA field 440 includes coding indication information that indicates which one of BCC and LDPC coding applies to a data field that is intended to be transmitted to MU-MIMO paired receiving STAs. In such case, the MCS (modulation coding scheme) information for each receiving STA may be included in the VHT-SIGB field 470.

The VHT-STF 450 is used to enhance the performance of the AGC estimation upon MIMO transmission.

The VHT-LTF 460 is used for an STA to estimate an MIMO channel. Since the VHT wireless LAN system supports MU-MIMO, as many VHT-LTFs 460 as the number of spatial streams through which the PPDU 400 is transmitted may be set. Additionally, in case full channel sounding is supported and this is performed, the number of VHT LTFs may be increased.

The VHT-SIGB field 470 includes dedicated control information necessary for a plurality of STAs to receive the PPDU 400 to obtain data. Accordingly, only when the control information included in the VHT-SIGA field 440 indicates that the currently received PPDU 400 is the one that is MU-MIMO transmitted, the STA may be designed to decode the VHT-SIGB field 470. In contrast, in case the control information included in the VHT-SIGA field 440 indicates that the currently received PPDU 400 is provided for a single STA including SU-MIMO), the STA may be designed to not decode the VHT-SIGB field 470.

The VHT-SIGB field 470 may include information on the MCS (modulation and coding scheme) for each STA and information on rate-matching. Further, the VHT-SIGB field 470 may include information indicating a PSDU length included in the data field for each STA. The information indicating the length of the PSDU is information indicative of the length of the bit sequence of the PSDU and may perform the indication on a per-octet basis. Meanwhile, in case the PPDU is SU-transmitted, information on the MCS is included in the VHT-SIGA field 440, so that it may not be included in the VHT-SIGB field 470. The size of the VHT-SIGB field 470 may vary depending on the type (MU-MIMO or SU-MIMO) of MIMO transmission and the channel bandwidth used for transmission of the PPDU.

The data field 480 includes data that is intended to be transmitted to an STA. The data field 480 a PSDU (PLCP Service Data Unit) where an MPDU (MAC Protocol Data Unit) is transferred in the MAC layer, a service field for initializing a scrambler, a tail field including a bit sequence necessary for turning the convolution encoder back into a zero state, and padding bits for standardizing the length of the data field. In the case of MU transmission, each data unit intended to be transmitted may be included in the data field 480 transmitted to each STA. The data unit may be an A-MPDU (aggregate MPDU).

The fields included in each PPDU format shown in FIGS. 3 and 4 may be transmitted as OFDM symbols through the processing of the physical layer. In particular, the data sequence constituting the data field may be transmitted as at least one or more data OFDM symbols depending on its size. Further, normal generation, transmission, reception and interpretation of the data OFDM symbols may be interfered due to a discrepancy in transmitter-receiver temporal sync and inter-symbol interference. To prevent thus, a guard interval (GI) may apply to the data OFDM symbol, thus preventing possible abnormal operation while guaranteeing highly reliable transmission/reception of data units. Further, an SGI applies to the HT wireless LAN system and VHT wireless LAN system, thus saving the time that is consumed due to the guard interval. Therefore, more efficient transmission/reception may be ensured. In the HT wireless LAN system and VHT wireless LAN system, the signal field and the VHT-SIGA field may be indicative of whether the SGI applies.

In case the AP 10 transmits data to the STA1 21, STA2 22, and STA3 23 in a wireless LAN system as shown in FIG. 1, a PPDU may be transmitted to an STA group including the STA1 21, the STA2 22, the STA3 23, and the STA4 24. In such case, as shown in FIG. 4, no spatial stream may be allocate to the STA4 24 while a predetermined number of spatial streams are allocated to each of the STA1 21, the STA2 22, and the STA3 23, and data may be then transmitted. In the example illustrated in FIG. 4, it can be seen that one spatial stream, three spatial streams, and two spatial streams are allocated to the STA1 21, the STA2 22, and the STA3 23, respectively.

Figure 5:
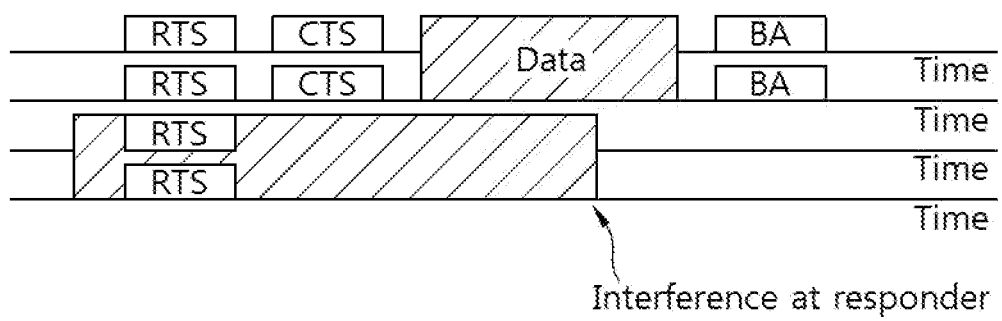
FIG. 5 is a view illustrating a dynamic bandwidth indication.

FIG. 5 is a view illustrating a dynamic bandwidth indication.

Referring to FIG. 5, an AP and/or STA operates dynamic bandwidth allocation as RTS/CTS exchange. For example, in case the AP and/or STA transmits signals on several frequency channels, it increases the efficiency of frequency use by sensing a frequency channel having interference through RTS (request to send)/CTS (clear to send) exchange and handshaking the dynamic frequency allocation that avoids it.

Figure 6:
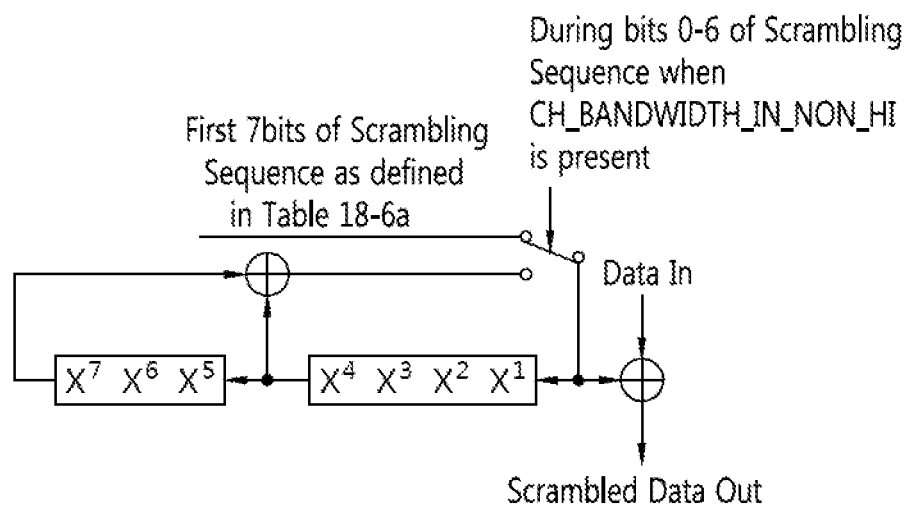
FIG. 6 is a view illustrating a method of performing data scrambling in 802.11ac.

FIG. 6 is a view illustrating a method of performing data scrambling in 802.11ac.

Referring to FIG. 6, allocation of a dynamic frequency in 802.11ac may be performed by inserting bandwidth (BW) information into an RTS or CTS signal. For example, as shown in FIG. 6, while a scrambler seed is input into a service field of a PPDU, it is introduced and inserted as an operator. Table 2 shows details of first seven bits in a scrambling sequence when CH_BANDWIDTH_IN_HT exists.

TABLE 2

|  |  | First 7 bits of Scrambling Sequence | | | |
| --- | --- | --- | --- | --- | --- |
| Parameter | Condition | B0 B3 Transmit order | | B4 | B5 B6 |
| TXVECTOR | CH_BANDWIDTH_IN_NON_HT is present and DYN_BANDWIDTH_IN_NOT_HT is not present in TXVECTOR | 5-bit(#4758) pseudo-random nonzero integer if CH_BANDWIDTH_IN_NON_HT equals CBW20 and a 5-bit(#4758) pseudo-random integer otherwise | | | CH_BANDWIDTH_IN_ NON_HT |
| TXVECTOR | CH_BANDWIDTH_IN_NON_HT is present and DYN_BANDWIDTH_IN_NOT_HT is present in TXVECTOR | 4-bit(#4758) pseudo-random nonzero integer if CH_BANDWIDTH_IN_NON_HT equals CBW20 and DYN_BANDWIDTH_IN_NON_HT equals Static, and a 4-bit(#4758) pseudo-random integer otherwise | | DYN_BANDWIDTH_ IN_NON_HT | |
| RXVECTOR | CH_BANDWIDTH_IN_NON_HT and DYN_BANDWIDTH_IN_NOT_HT are present in RXVECTOR | — | | DYN_BANDWIDTH_ IN_NON_HT (#5100) | CH_BANDWIDTH_IN_ NON_HT (#5100) |

Next, a dynamic bandwidth indication in 802.11ah is disclosed. Each 802.11ah-based AP and/or STA may recognize both 1 MHz preamble and 2 MHz preamble. However, unlike 802.11ac, 802.11ah need not consider co-existing with a previous version of legacy AP and/or STAs and inverse-compatibility in a corresponding band. Accordingly, transmission of NON_HT_DUPLICATE considering inverse compatibility is not defined.

Meanwhile, in 802.11ah, all the APs and/or STAs should be able to decipher the 1 MHz preamble and 2 MHz preamble. As bandwidth information available from the preamble, there are bandwidth information in the 1 MHz mode and bandwidth information in the 2 MHz mode or more. Table 3 below shows an example indicating the number of obits of a bandwidth indication in a short preamble and a long preamble.

TABLE 3

|  | Short Preamble | Long Preamble |
| --- | --- | --- |
| Length/Duration | 9 | 9 |
| MCS | 4 | 4 |
| BW | 2 | 2 |
| Aggregation | 1 | |
| STBC | 1 | 1 |
| Coding | 2 | 5 |
| SGI | 1 | 1 |
| GID | | 6 |
| Nsts | 2 | 8 |
| PAID | 9 | |
| ACK Indication [11] | 2 | 2 |
| Reserved | 5 | 4 |
| CRC | 4 | 4 |
| Tail | 6 | 6 |
| Total | 48 | 48 |

For the dynamic bandwidth indication to be performed in 802.11ah, the AP and/or STAs identify the dynamic bandwidth indication with bandwidth information in a mode of 2 MHz or more and identifies that the bandwidth is 1 MHz through auto detection in the 1 MHz mode.

However, since in the 802.11ah system when a preamble is received over a multi-channel in the time domain as shown in FIG. 5, the receiver (AP and/or STA) cannot be aware of what number of frequency piece (as much as 2 MHz) among them it is, an error may occur while the bandwidth information is deciphered. This is why a phase rotation pattern applies as shown in Equation 2 as follows:

$$r_{VHT\text{-}SIG\text{-}A}^{(i_{Seg}, i_{TX})}(t) = \frac{1}{\sqrt{N_{VHT\text{-}SIG\text{-}A}^{Tone} N_{TX}}} \sum_{n=0}^{1} w_{T_{SYML}}(t - nT_{SYML}) \cdot$$

$$\sum_{i_{BW}=0}^{N_{20\_MHz}-1} \left( \sum_{k=-26}^{26} \Upsilon_{(k - K_{Shift}(i_{BW})), BW} (j^n D_{k,n,BW} + \right.$$

$$p_{n+1} P_k) \cdot \exp(j2\pi(k - K_{Shift}(i_{BW}))$$

$$\left. \Delta_F(t - nT_{SYML} - T_{GI} - T_{CS}^{j_{TX}})) \right)$$

[Equation 2]

Here, the relationship between the channel bandwidth (CH_BANDWIDTH) and $Y_{k,BW}$ is as follows:

TABLE 4

| CH_BANDWIDTH | $Y_{k,BW}$ |
| --- | --- |
| CBW20 | $Y_{k,20}$ |
| CBW40 | $Y_{k,40}$ |
| CBW80 | $Y_{k,80}$ |
| CBW160 | $Y_{k,160}$ |
| CBW80 + 80 | $Y_{k,80}$ per segment |

Referring to Equation 2, like 802.11ac, 802.11ah also, upon dynamic bandwidth allocation (or dynamic frequency allocation), applies a phase rotation pattern on frequency axis to reduce PAPR of SIG. This phase rotation pattern varies depending on what the frequency span of the whole multi-channel is as introduced below. This affects the system stability.

4 MHz preamble: phase rotation pattern for each 2 MHz piece=[1 j]

8 MHz preamble: phase rotation pattern for each 2 MHz piece=[1 −1 −1 −1]

16 MHz preamble: phase rotation pattern for each 2 MHz piece=[1 −1 −1 −1 1 −1 −1 −1]

Accordingly, a method is demanded of supporting dynamic bandwidth allocation while distinguishing when a phase rotation pattern is allowed from when no phase rotation pattern is allowed. To address such problem, a method of indicating a bandwidth according to an embodiment of the present invention is not described.

According to an embodiment of the present invention, the AP and/or STA applies phase rotation to PPDUs but does not apply phase rotation to a PPDU associated with bandwidth indication such as RTS or CTS (or PPDU for exchange of bandwidth information). That is, the AP and/or STA transmits (or codes) or receives (or decodes) a PPDU associated with bandwidth indication to which no phase rotation is applied. That is, the phase rotation is selectively allowed, thus addressing problems with inflexible application of phase rotation. This may be very simply implemented, and the receiver's decoding may be simplified as well.

Here, a TXVECTOR parameter, information indicating that the PPDU is associated with bandwidth indication, for example, "BW_EXCHANGE", should be additionally defined. Accordingly, the AP and/or STA may indicate that the PPDU is associated with bandwidth information based on the TXVECTOR parameter, "BW_EXCHANGE." For this purpose, NON_HT_MODULATION in 802.11ac as shown in Table 5 below may be referred to.

TABLE 5

| NON_HT_MODULATION | FORMAT is NON_HT | On transmit indicates the format type of the transmitted non-HT PPDU. On receive indicates the estimated format type of the received non-HT PPDU. Enumerated type. OFDM indicates Clause 18 (Orthogonal frequency division multiplexing (OFDM) PHY specification) format NON_HT_DUP_OFDM indicates non-HT duplicate format | Y | Y |
|---|---|---|---|---|
| | Otherwise | Not present | N | N |

Meanwhile, for bandwidth indication, a method is required of indicating whether it is dynamic or static. That is, there is a need for a method of indicating whether partial utilization of an existing bandwidth notified is available or not. For this purpose, one bit of "DYN_BANDWIDTH" may be added to the SIG field in the 2 MHz preamble (short preamble and long preamble), thereby supporting the capability of the dynamic bandwidth indication. That is, one bit of DYN_BANDWIDTH is needed regarding whether the used frequency bandwidth may be dynamically set as shown in Table 6, and this may be added to the SIG field of the 802.11ah 2 MHz preamble.

TABLE 6

| Enumerated value | Value |
|---|---|
| CBW20 | 0 |
| CBW40 | 1 |
| CBW80 | 2 |
| CBW160 or CBW80 + 80 | 3 |

Table 7 shows what values are indicated by DYN_BANDWIDTH added to the SIG field.

TABLE 7

| Enumerated value | Value |
|---|---|
| Static | 0 |
| Dynamic | 1 |

For example, referring to Table 6, if DYN_BANDWIDTH=0, it denotes 'static', and if DYN_BANDWIDTH=1, it denotes 'dynamic.'

By doing so, already defined bandwidth information may be also utilized in the 802.11ah preamble. Upon bandwidth indication, phase rotation may be selectively allowed, thus addressing problems that may occur when phase rotation is inflexibly applied as conventional.

According to another embodiment, the AP and/or STA, rather than using the bandwidth information inscribed (or scrambled) in the SIG field of the 802.11ah preamble for the purpose related to bandwidth information, may additionally insert the bandwidth information and DYN_BANDWIDTH information into the service field of the corresponding PPDU as a feeding function of inputting the scrambler seed. By doing so, load required for calculating the phase rotation may be reduced. However, the designed structure of the existing SIG field in the preamble should be modified. Further, the bandwidth information needs to be inscribed in the service field as the scrambler seed, and this needs to be decoded by the receiver.

Figure 7:
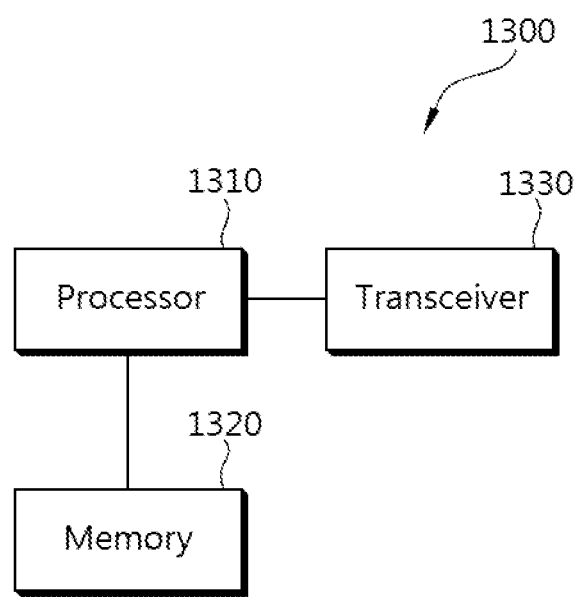
FIG. 7 is a block diagram illustrating a wireless device in which an embodiment of the present invention may be implemented.

FIG. 7 is a block diagram illustrating a wireless device in which an embodiment of the present invention may be implemented.

Referring to FIG. 7, the wireless device 1300 includes a processor 1310, a memory 1320, and a transceiver 1330. The transceiver 1330 transmits and/or receives wireless signals and implements a physical layer based on IEEE 802.11. The processor 1310 may be configured to operate while operatively connected with the transceiver 1330. The processor 1310 may be configured to generate an SIG field for power boosting as disclosed herein. The processor 1310 may be configured to generate an NDP as described herein and to transmit/receive the NDP. The processor 1310 may be configured to perform a bandwidth indication according to an embodiment of the present invention.

Further, the AP or STA shown in FIG. 1 includes the wireless device 1300 shown in FIG. 7.

The processor 1310 and/or the transceiver 1330 may include an ASIC (Application-Specific Integrated Circuit), other chipsets, a logic circuit, and/or a data processing device. When the embodiment is implemented in software, the above-described scheme may be embodied in a module (procedure, function, etc.) that performs the above-described function. The module may be stored in the memory 1320 and may be executed by the processor 1310. The memory 1320 may be included in the processor 1310 or may be positioned outside the processor 1310 and may be operatively connected with the processor 1310 via various known means.

Although in the above-described exemplary system, the methods are described based on a series of steps or blocks, the present invention is not limited to the order of the steps. Rather, some steps may be performed simultaneously or in a different order with other steps. It may be understood by those skilled in the art that the steps in the flowchart do not exclude each other and other steps may be added or some of the steps may be omitted from the flowchart without affecting the scope of the present invention.

What is claimed is:

1. A wireless device comprising:
a transceiver configured to transmit and receive a wireless signal; and
a processor configured to operate in operative connection with the transceiver and to generate a PPDU (physical protocol data unit),
wherein the PPDU is generated by selectively applying a phase rotation pattern according to whether a bandwidth indication is associated with the PPDU, such that the phase rotation pattern is not applied when the PPDU is associated with the bandwidth indication.

2. The wireless device of claim 1, wherein the processor is configured to determine whether the PPDU is associated with the bandwidth indication based on a TXVECTOR parameter denoting bandwidth exchange (BW_EXCHANGE).

3. The wireless device of claim 1, wherein the processor is configured to generate a SIG field including one bit of DYN_BANDWIDTH denoting whether the bandwidth indication is dynamic or static.

4. The wireless device of claim 1, wherein the processor is configured to generate the PPDU without applying the phase rotation pattern when the PPDU is a Ready To Send (RTS) PPDU associated with the bandwidth indication or a Clear To Send (CTS) PPDU associated with the bandwidth indication.

5. A method of performing a bandwidth indication by a wireless device in a wireless LAN system, the method comprising:
generating a PPDU (physical protocol data unit); and
transmitting the PPDU,
wherein the PPDU is generated by selectively applying a phase rotation pattern according to whether a bandwidth indication is associated with the PPDU, such that the phase rotation pattern is not applied when the PPDU is associated with the bandwidth indication.

6. The method of claim 5, further including determining whether the PPDU is associated with the bandwidth indication based on a TXVECTOR parameter denoting bandwidth exchange (BW_EXCHANGE).

7. The method of claim 5, further comprising generating a SIG field including one bit of DYN_BANDWIDTH denoting whether the bandwidth indication is dynamic or static.

8. The method of claim 5, wherein the PPDU which is associated with the bandwidth indication is a Ready To Send (RTS) PPDU or a Clear To Send (CTS) PPDU.

* * * * *